United States Patent

[11] 3,579,126

| [72] | Inventor | John J. Paul |
| --- | --- | --- |
| | | Montreal, Quebec, Canada |
| [21] | Appl. No. | 768,487 |
| [22] | Filed | Oct. 17, 1968 |
| [45] | Patented | May 18, 1971 |
| [73] | Assignee | Sperry Rand Canada Limited |
| | | Toronto, Ontario, Canada |
| [32] | Priority | Aug. 29, 1968 |
| [33] | | Canada |
| [31] | | 028,840 |

[54] DUAL SPEED GATED COUNTER
4 Claims, 2 Drawing Figs.

[52] U.S. Cl.................................................. 328/129,
328/109, 328/41, 328/48
[51] Int. Cl................................................ H03k 17/28
[50] Field of Search.......................................... 328/129,
48, 109, 41

[56] References Cited
UNITED STATES PATENTS

| 3,218,553 | 11/1965 | Peterson et al. ............. | 328/129X |
| 3,309,463 | 3/1967 | Roedl............................ | 328/129X |

*Primary Examiner*—John S. Heyman
*Attorney*—S. C. Yeaton

ABSTRACT: Counting apparatus for determining the elapsed time between a reference pulse and the next following positive peak of a delayed sine wave irrespective of the DC level of the sine wave. The apparatus comprises a clock pulse source producing full rate and half rate pulses which are applied through respective gates to a single pulse counter. The first (full rate) gate is turned on by the reference pulse and is turned off upon the first following positive-going crossover of the delayed sine wave. The second (half rate) gate is turned on simultaneously with the termination of the first gate and is turned off upon the next following negative-going crossover of said delayed sine wave.

INVENTOR.
JOHN J. PAUL
BY Robert F. Haan
ATTORNEY

DUAL SPEED GATED COUNTER

BACKGROUND OF THE INVENTION

The invention relates to apparatus for determining the elapsed time between a reference signal and a delayed signal. In many data communication or position follower systems, both the reference and the delayed signals are respective trains of pulses. The latter pulses frequently are derived from a delayed sine wave whereby the pulses coincide with the crossovers of the sine wave at some arbitrary DC level. In the event that the arbitrary level remains constant, the delay between a given reference pulse and the first following positive-going crossover pulse reliably represents the amount of time delay of the sine wave relative to the reference pulse. If, on the other hand, the arbitrary level varies in an unknown manner as a result of changing ambient conditions such as temperature, then the time delay of the crossover pulses with respect to the reference pulses no longer faithfully represents the delay of the sine wave relative to the reference pulses.

A variable DC component is present to some extent in any amplifier through which the delayed sine wave may pass. Low drift amplifiers are relatively expensive and hence, undesirable in systems requiring high precision and economy of design. Not only is it difficult to avoid the introduction of the variable DC component in the delayed sine wave, but it is difficult and expensive to extract it after it has been generated and before the zero crossover pulses are derived from the delayed sine wave. For example, it might be possible to block the unwanted DC component by a capacitor where the component is produced in an amplifier through which the delayed sine wave passes. However, another unwanted DC level can be inserted into the sine wave signal by the very circuit which produces the crossover pulses.

The object of the present invention is to provide an accurate measure of the time delay between a reference pulse and a delayed sine wave by utilizing crossover pulses derived from the delayed sine wave without extracting the DC component, if present, or otherwise altering the delayed sine wave.

SUMMARY OF THE INVENTION

The invention determines the elapsed time between a reference pulse and the next following positive peak of a delayed sine wave by gating clock pulses into a counter at the full clock rate during one time interval and by gating pulses at half the aforesaid rate into the same counter during a subsequent time interval. The first time interval occurs from the reference pulse to the next following positive-going crossover pulse derived from the delayed sine wave when it crosses an arbitrary DC level. The subsequent time interval occurs from the termination of the first interval to the next following negative-going crossover pulse.

Counting at half the clock rate between successive crossover pulses is fully equivalent to counting at the full clock rate between the same two crossover pulses and then dividing the resulting count by two. This, in turn, is equivalent to counting at the full clock rate from the first crossover pulse to the peak of the sine wave midway between the two crossover pulses. The total result is the same as though pulses at the full clock rate were accumulated in the counter during the entire time interval between the reference pulse and the next following positive peak of the sine wave from which the crossover pulses are derived. Such a count is wholly unaffected by the presence of a DC component in the sine wave. Although the timing of the crossover pulses is determined by the amount, if any, of the DC component in the sine wave, the occurrences of the peaks of the sine wave are completely unaffected thereby.

DESCRIPTION OF THE PREFERRED EMBODIMENT

Figures 1, 2:
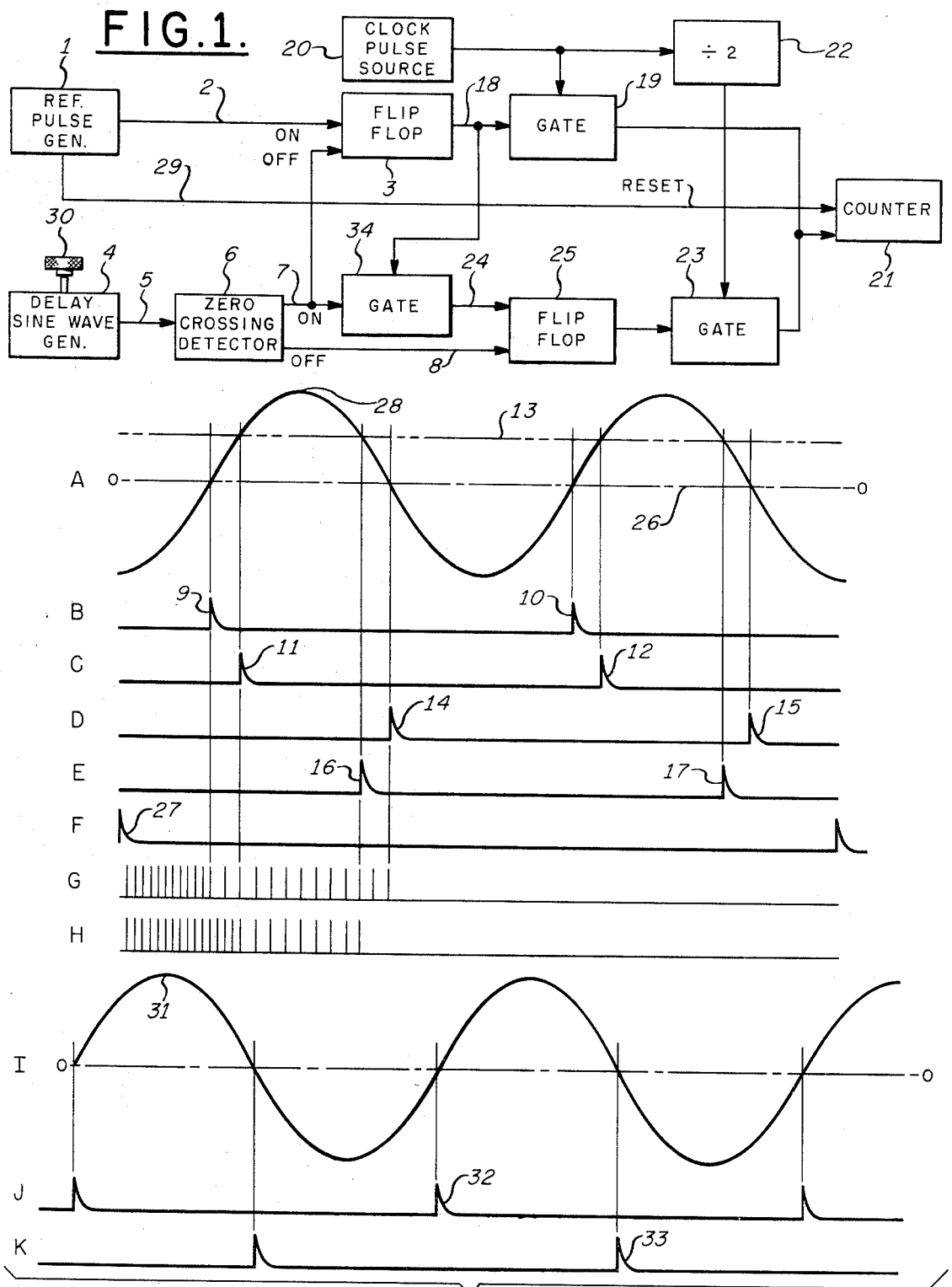
FIG. 1 is a simplified block diagram of a typical embodiment of the present invention.
FIG. 2 is a series of idealized waveforms helpful in understanding the operation of the embodiment of FIG. 1.

Referring to FIG. 1, reference pulse generator 1 provides a reference timing signal in the form of a regularly recurring train of pulses on line 2 at a first input of flip-flop 3. Each of the pulses on line 2 places flip-flop 3 in a binary state defined as the "on" state. Delay sine wave generator 4 provides on line 5 a sine wave having a period equal to one-half that of the reference pulses on line 2 and having a phase (time delay) determined by the setting of control knob 30. It will be understood that the manner in which the delay is introduced into the sine wave varies widely in accordance with the nature of the system applications involved and forms no part of the present invention.

The delayed sine wave on line 5 is applied to zero crossing detector 6 which provides on line 7 a pulse each time that the sine wave on line 5 crosses its DC level in a positive-going direction and provides on line 8 a pulse each time that the sine wave on line 5 crosses its DC level in a negative-going direction. A suitable detector is described in U.S. Pat. No. 3,156,907 issued on Nov. 10, 1964 to Walter C. Lanning et al. and assigned to the present assignee. The sine wave on line 5 is represented by waveform A of FIG. 2. Pulses 9 and 10 of waveform B represent the pulses on line 7 of FIG. 1 when the DC level of the sine wave is zero whereas pulses 11 and 12 of waveform C represent the pulses on line 7 when DC level 13 is present in the sine wave of waveform A. Similarly, pulses 14 and 15 of waveform D represent the pulses on line 8 of FIG. 1 when a zero DC level is present whereas pulses 16 and 17 of waveform E of FIG. 2 represent the pulses on line 8 of FIG. 1 when DC level 13 is present in waveform A. Each of the pulses on line 7 is applied to flip-flop 3 and causes flip-flop 3 to assume the binary state defined as the "off" state. Thus, flip-flop 3 is turned on by a reference pulse on line 2 and is turned off by the next following pulse on line 7.

During the time that flip-flop 3 is on, a signal is generated on line 18 which renders gate 19 conductive to allow the clock pulses from source 20 to pass through to counter 21. Counter 21 is reset to zero by each pulse on line 29 which immediately precedes each pulse on line 2. Clock pulse source 20 is coupled via divide-by-two circuit 22 to gate 23 whereby pulses at half the rate of clock pulse source 20 are also coupled to counter 21 during the time that gate 23 is rendered conductive. Gate 23, in turn, is turned on by a signal produced on line 24 and appearing at the output of flip-flop 25 each time that flip-flop 25 is in its on state. Flip-flop 25 is turned on by each pulse on line 7 that passes through gate 34 when it is in a conducting state and is turned off by the next following pulse on line 8.

Gate 34 is rendered conductive simultaneously with gate 19 by the signal on line 18. It should be noted that because of the slight delay in the OFF response of flip-flop 3 to a given pulse on line 7, the given pulse passes through gate 34 before gate 34 is rendered nonconductive by the signal on line 18 resulting from the change in state of flip-flop 3 to the OFF condition. Thus, flip-flop 25 is turned ON only by the first pulse on line 7 following a given reference pulse 27. For example, pulse 9 turns flip-flop 25 ON but pulse 10 does not. Pulse 10 is blocked by closed gate 34 which does not reopen again until the occurrence of the next following reference pulse 27 on line 2.

Waveform F of FIG. 2 represents the pulses generated by reference pulse generator 1 of FIG. 1. The period of waveform F is twice the period of the sine wave of waveform A, as previously mentioned. Three typical situations will be considered in order to exemplify the operation of the embodiment of FIG. 1. In the first case, it will be assumed that the zero valued DC level represented by line 26 is present in the sine wave of waveform A. In this case, zero crossing detector 6 provides pulses 9 and 10 of waveform B on line 7 and pulses 14 and 15 of waveform D on line 8 of FIG. 1. The result is that pulses at the full clock rate of source 20 are applied to counter 21 during the time between pulse 27 of waveform F and pulse 9 of waveform B. Simultaneously upon the occurrence of pulse 9, gate 19 is closed and gate 23 is opened to allow pulses at half the clock rate to be applied to counter 21. Gate 23 is closed upon the occurrence of pulse 14 to terminate the counting action of counter 21. The pulses of waveform G represent the total number of full rate and half rate pulses which are accumulated in counter 21; 24 are shown by way of example.

In the second case to be considered, it will be assumed the positive valued DC level represented by line 13 is present in the sine wave of waveform A. Zero crossing detector 6 now produces pulses 11 and 12 of waveform C on line 7 and pulses 16 and 17 of waveform E on line 8 of FIG. 1. Gate 19 is opened from pulse 27 of waveform F to pulse 11 of waveform C whereas gate 23 is opened from pulse 11 of waveform C to pulse 16 of waveform E. Thus, pulses at the full clock rate of source 20 are applied to counter 21 during the time between pulse 27 of waveform F and pulse 11 of waveform C. Pulses at half said clock rate are applied to counter 21 during the time between pulse 11 of waveform C and pulse 16 of waveform E. The pulses of waveform H show the total number of full rate and half rate pulses which are applied to counter 21. It will be noted that the same number of pulses appear in waveforms G and H indicating that the same count is reached irrespective of the value of the DC level present in waveform A. Simply by multiplying the total count in the counter in the known repetitive interval of the clock pulses of source 20, a reliable measure is achieved of the elapsed time between the occurrence of a reference pulse (such as pulse 27 of waveform F) and the next following positive peak (such as peak 28) of the delayed sine wave.

In the presence of a DC component other than a zero valued DC component in the delayed sine wave, the occurrences of the successive crossover pulses produced by detector 6 are nonevenly spaced, e.g., pulses 11 and 16 are more closely spaced than are pulses 16 and 12. In the event of the positive-valued DC component represented by line 13 in waveform A, the derived pulses 11 and 16 are more closely spaced than pulses 9 and 14, the latter of which are produced in the event of the zero-valued DC component represented by line 26 of waveform A. It will be noted more particularly that pulse 11 lags pulse 9 whereas pulse 16 leads pulse 14. Consequently, the full rate pulses are applied to counter 21 for a longer period in the case of pulse 11 than in the case of pulse 9 resulting in a temporarily higher count. However, counting at the half clock rate is terminated with pulse 16 prior to pulse 14 so that the excess count at the full clock rate is precisely compensated by the lower count at the half clock rate. The result is that the same count is accumulated in counter 21 in the case of waveforms B and D as in the case of waveforms C and E. In effect, the stored count represents the total time interval between pulse 27 of waveform F and peak 28 of waveform A which time interval is unaffected by the presence of a DC component in waveform A.

Another situation of interest is the case depicted by waveform I wherein the positive peak is delayed by less than 90° (for example, 45°) relative to reference pulse 27 of waveform F. Simply by making the capacity of counter 21 equal to the number of pulses produced by source 20 of FIG. 1 during the full period of waveform A, the resulting count in counter 21 correctly represents the fractional period delay of waveform I. As before, the full rate count is started by reference pulse 27 of waveform G and stopped by pulse 32 of waveform J (coinciding with the first following positive-going crossover of waveform I). The half rate count is begun with pulse 32 and terminated with pulse 33 of waveform K. The full rate count represents a delay of 315° while the half rate count represents an additional delay of 90° for a total delay of 405°. However, only the proper count representing 45° (405°—360°) remains in counter 21.

While the invention has been described in its preferred embodiment, it is to be understood that the words which have been used are words of description rather than limitation and that changes within the purview of the appended claims may be made without departing from the true scope and spirit of the invention in its broader aspects.

I claim:

1. Apparatus for determining the time interval between a reference pulse and the midpoint between two subsequent delayed pulses comprising
   a clock pulse source generating pulses of a predetermined repetition rate including means for providing an output at one-half said repetition rate,
   a pulse counter,
   a source of reference pulses that supplies reference pulses having a frequency less than one-half said repetition rate,
   a source of delayed pulses that supplies pulses having a frequency less than said one-half said repetition rate and that supplies at least two of said delayed pulses after the occurrence of one of said reference pulses, and
   gating means coupled to said source of reference pulses to receive said reference pulses, to said source of delayed pulses to receive said delayed pulses, and to said clock pulse source to receive said predetermined repetition rate pulses and said one-half said repetition rate pulses,
   said gating means applying said predetermined repetition rate pulses to said counter during the time between one of said reference pulses and one of said delayed pulses following said one of said reference pulses and applying said one-half said repetition rate pulses to said counter during the time between said one of said delayed pulses and the next following delayed pulse,
   the number of said one-half said repetition rate pulses between said one delayed and said next following delayed pulse being equivalent to the number of predetermined repetition rate pulses generated by said clock pulse source during the time period between said one delayed pulse and the midpoint between said one delayed pulse and said next following delayed pulse,
   whereby the total of said predetermined repetition rate pulses between said one reference pulse and said one delayed pulse plus the number of said one-half said repetition rate pulses between said one delayed pulse and said next following delayed pulse represents the time period between said one reference pulse and said midpoint between said one delayed pulse and said next following delayed pulse.

2. Apparatus for determining the time interval between a reference pulse and the midpoint between two subsequent delayed pulses comprising
   a clock pulse source generating pulses of a predetermined repetition rate including means for providing an output at one-half said repetition rate,
   a pulse counter,
   a source of reference pulses that supplies reference pulses having a frequency less than said one-half said repetition rate,
   a source of delayed pulses which comprises a source of delayed sine wave signal and means coupled to receive said delayed sine wave signal for providing a delayed pulse each time said delayed sine wave signal passes through an arbitrary value, and
   gating means coupled to said source of reference pulses to receive said reference pulses, to said source of delayed pulses to receive said delayed pulses, and to said clock pulse source to receive said predetermined repetition rate pulses and said one-half said repetition rate pulses,
   said gating mans applying said predetermined repetition rate pulses to said counter during the time between one of said reference pulses and one of said delayed pulses following said one of said reference pulses and applying said one-half said repetition rate pulses to said counter during the time between said one of said delayed pulses and the next following delayed pulse,
   the number of said one-half said repetition rate pulses between said one delayed pulse and said next following delayed pulse being equivalent to the number of predetermined repetition rate pulses generated by said clock pulse source during the time period between said one delayed pulse and the midpoint between said one delayed pulse and said next following delayed pulse, whereby the total of said predetermined repetition rate pulses between said one reference pulse and said one delayed pulse plus the number of said one-half said repetition rate pulses between said one delayed pulse and said next following delayed pulse represents the time period between said one reference pulse and said midpoint between said one delayed pulse and said next following delayed pulse.

3. Apparatus for determining the time interval between a reference pulse and the midpoint between two subsequent delayed pulses comprising a clock pulse source generating pulses of a predetermined repetition rate including means for providing an output at one-half said repetition rate, a pulse counter, a source of reference pulses that supplies reference pulses having a frequency less than said one-half said repetition rate, a source of delayed pulses which comprises a source of delayed sine wave signal and means coupled to receive said delayed sine wave signal for providing a delayed pulse each time said delayed sine wave signal passes through an arbitrary value, said means, coupled to receive said delayed sine wave signal for providing said delayed pulse, providing a first pulse when said delayed sine wave signal passes through said arbitrary value in a positive direction and providing a second pulse when said delayed sine wave signal passes through said arbitrary value in a negative direction, said first pulse being said one of said delayed pulses, said second pulse being said next following delayed pulse, and gating means coupled to said source of reference pulses to receive said reference pulses, to said source of delayed pulses to receive said delayed pulses, and to said clock pulse source to receive said predetermined repetition rate pulses and said one-half said repetition rate pulses, said gating means applying said predetermined repetition rate pulses to said counter during the time between one of said reference pulses and one of said delayed pulses following said one of said reference pulses and applying said one-half said repetition rate pulses to said counter during the time between said one of said delayed pulses and the next following delayed pulse, the number of said one-half said repetition rate pulses between said one delayed pulse and said next following delayed pulse being equivalent to the number of predetermined repetition rate pulses generated by said clock pulse source during the time period between said one delayed pulse and the midpoint between said one delayed pulse and said next following delayed pulse, whereby the total of said predetermined repetition rate pulses between said one reference pulse and said one delayed pulse plus the number of said one-half said repetition rate pulses between said one delayed pulse and said next following delayed pulse represents the time period between said one reference pulse and said midpoint between said one delayed pulse and said next following delayed pulse.

4. Apparatus for determining the time interval between a reference pulse and the midpoint between two subsequent delayed pulses comprising a clock pulse source generating pulses of a predetermined repetition rate including means for providing an output at one-half said repetition rate, a pulse counter, a source of reference pulses that supplies reference pulses having a frequency less than said one-half said repetition rate, a source of delayed pulses which comprises a source of delayed sine wave signal and means coupled to receive said delayed sine wave signal for providing a delayed pulse each time said delayed sine wave signal passes through an arbitrary value, said delayed sine wave signal comprising a direct component having said arbitrary value, said means coupled to receive said delayed sine wave signal being a zero crossing detector, and gating means coupled to said source of reference pulses to receive said reference pulses, to said source of delayed pulses to receive said delayed pulses, and to said clock pulse source to receive said predetermined repetition rate pulses and said one-half said repetition rate pulses, said gating means applying said predetermined repetition rate pulses to said counter during the time between one of said reference pulses and one of said delayed pulses following said one of said reference pulses and applying said one-half said repetition rate pulses to said counter during the time between said one of said delayed pulses and the next following delayed pulse, the number of said one-half said repetition rate pulses between said one delayed pulse and said next following delayed pulse being equivalent to the number of predetermined repetition rate pulses generated by said clock pulse source during the time period between said one delayed pulse and the midpoint between said one delayed pulse and said next following delayed pulse, whereby the total of said predetermined repetition rate pulses between said one reference pulse and said one delayed pulse plus the number of said one-half said repetition rate pulses between said one delayed pulse and said next following delayed pulse represents the time period between said one reference pulse and said midpoint between said one delayed pulse and said next following delayed pulse.